June 24, 1941.　　　B. J. SHEPARD　　　2,247,258
SURGICAL INSTRUMENT
Filed Dec. 12, 1938
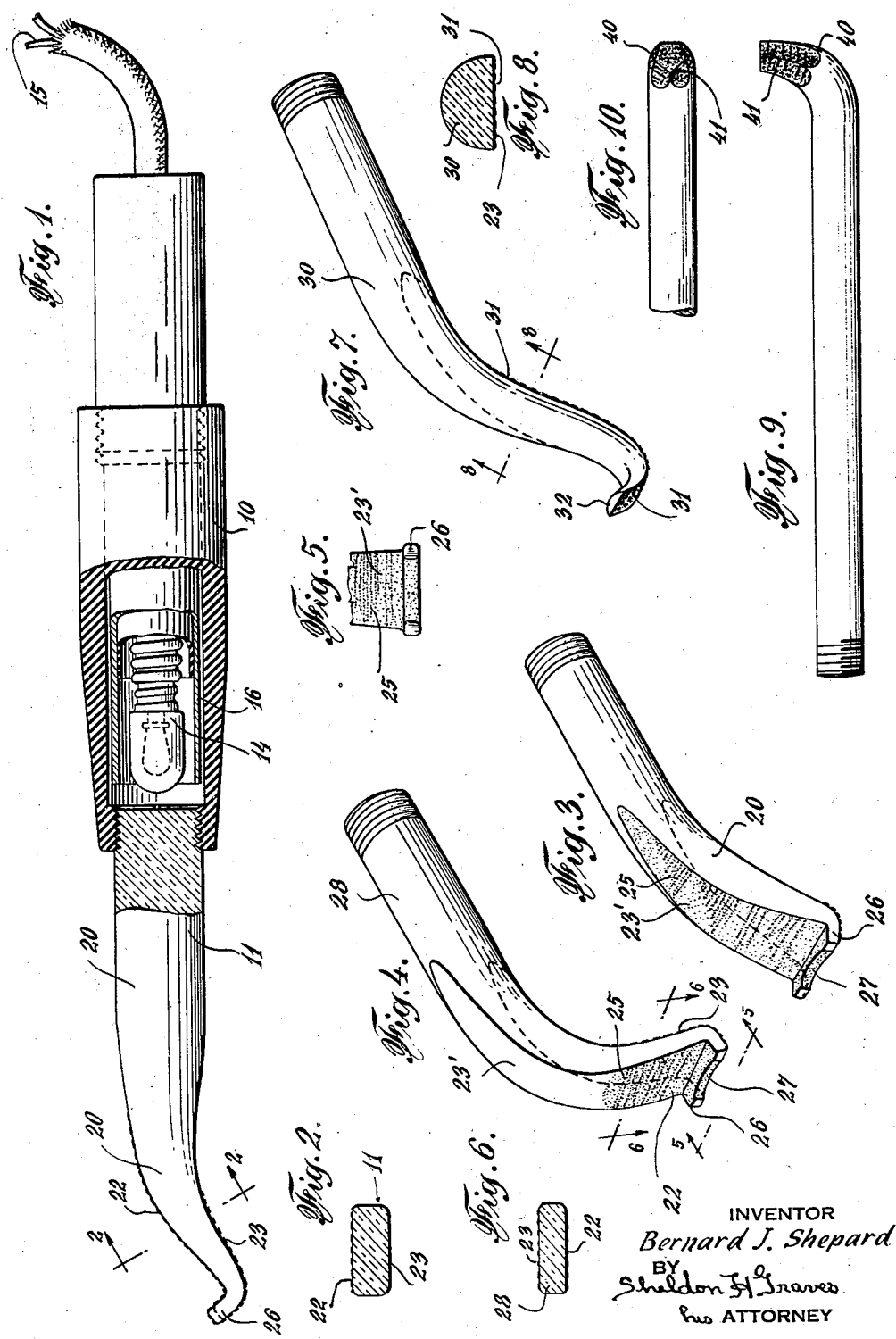
INVENTOR
Bernard J. Shepard
BY
Sheldon H. Graves
his ATTORNEY Patented June 24, 1941

2,247,258

UNITED STATES PATENT OFFICE 2,247,258

SURGICAL INSTRUMENT

Bernard J. Shepard, Brooklyn, N. Y., assignor to Kulite Corporation, New York, N. Y., a corporation of New York Application December 12, 1938, Serial No. 245,109

1 Claim. (Cl. 128—16)

This invention relates generally to illuminating devices and more particularly to surgical or dental instruments which have for a purpose the illumination of cavities in the body.

In practice I preferably employ an external source of illumination and a light transmitting medium adapted to be inserted into the mouth or cavity. For this medium, I preferably use a hard resin having high light transmitting characteristics. One such resin is the polymethyl methacrylate, a thermoplastic, which has the property of transmitting a very high percentage of light over the visible spectrum. This material is known to the trade as Lucite.

The resin employed for so called dental or medical applicators preferably takes the form of a rod which is straight and polished adjacent one end and is adapted to be mounted adjacent suitable source of illumination which projects a beam of light into that end. The rod adjacent the opposite end is curved and roughened along the portions from which it is desired that the light be emitted. I find it also very desirable in addition to roughening these portions, to score them along lines at right angles to the paths of light. As the end of the rod or tube when roughened is often more luminous than the side, in many of the applicators, in order that the end shall not be embedded in the flesh and the light hidden, I bend the end at an abrupt angle to the portion of the rod immediately adjacent thereto, as will be more fully explained hereafter.

With the use of the material I have mentioned, there is an almost negligible loss of light along the polished surface, it being substantially all concentrated along the roughened areas.

The applicator made of this material is of relatively light weight, simple, economical to manufacture and the light emitted is cool and does not burn the parts with which it comes into contact.

Other objects and advantages of my invention may be found from the following description taken in connection with the accompanying drawing wherein Figure 1 is a side elevation partly in section of one form of light transmitting rod forming an anterior retractor together with a holder therefor and source of illumination;

Figure 2 is a sectional view taken on the line 2—2 of Figure 1;

Figure 3 is a perspective view of the rod shown in Figure 1;

Figure 4 is a perspective view of a modified form of rod adapted for use as a posterior or S retractor;

Figure 5 is an end view of the rod shown in Figure 4 partly broken away;

Figure 6 is a sectional view taken on the line 6—6 of Figure 4;

Figure 7 is a perspective view of still another form of rod adapted for use as a tongue depressor;

Figure 8 is a sectional view taken on the line 8—8 of Figure 7;

Figure 9 is a side elevation of a further modified form of rod adapted for use as a transilluminator; and Figure 10 is a top elevation partly broken away of the form of rod shown in Figure 9.

Referring more particularly to Figure 1, reference character 10 represents a holder or casing formed of suitable insulating material having a screw threaded opening at one end into which one end of the rod 11 of high light transmitting capacity may be screwed. Inside the casing is an electric lamp 14 which is supplied with current from a suitable source by conductors 15. Located between the lamp 14 and the casing 10 is a metal tube 16 which serves to dissipate the heat from the lamp and also, to serve to some extent as a reflector. It will be understood that if desired, I may use a parabolic or other reflector in place of or in addition to the tube 16.

The retractor rod 11 is formed with a cylindrical surface 20, which is highly polished and is curved downwardly adjacent its outer end and is cut away or flattened forming surfaces 22 and 23 which surfaces are roughened, in whole or in part, and scored along lines 25 which, it will be seen from Figure 3, are in directions at right angles to the path of light.

The extreme outer end of the rod is bent abruptly upwardly to form a lip 26, the top and bottom and end surfaces of which are also roughened. The rod 11 which is intended for insertion between the gum and the lip, is formed at the outer end of the lip 26 with a concave face 27 which adapts the end better to the upper or lower inner surfaces of the mouth between the gums and lip to conform to the shape of the jaw bone.

In Figure 4, the posterior retractor rod is of somewhat greater curvature towards its outer end and is intended for holding the cheek away from the gum at the rear portion of the mouth and in the posterior region.

It is formed with a curved surface 23', any desired portion of which may be roughened and scored depending upon the area of luminosity desired.

Figure 7 is the tongue depressor and in this figure, it is to be noted that the rod 30 is tapered and is cylindrical or semi-cylindrical in cross section, being cut away or moulded to form a curved flat bottom surface 31 which is roughened beneath the upwardly curved tip 32 for any desired distance along the lower surface.

The function of the tip or the outer lips 26 of the forms previously described is to prevent embedding of the end of the applicator in the flesh and permit light to be emitted from the roughened luminous portion of the rod and the plano convex surface as indicated in Figure 8 produces condensation of the light emitted.

Figures 9 and 10 show the construction of a transilluminator, that is, a device for projecting light outwardly from between the teeth. As shown in Figure 9, it consists of a rod tapered and bent upwardly at its outer end as indicated at 40, the outer end being pentagonal, or if desired, triangular or other multiple sided in cross section with an inner edge 41, the upturned end being tapered, cut away and roughened. In use the end 40 is inserted in the mouth and the inner edge 41 pressed into the space between the teeth from behind.

Having described my invention, what I claim and desire to secure by Letters Patent is:

A dental or medical retractor comprising a rod of resin having high light transmitting properties, said rod having a straight portion adjacent one end with a polished surface, means for directing light into said end and said rod having a curved portion adjacent the opposite end, parts of the surface of said curved portion being roughened and the extreme end of said rod being bent at substantially a right angle to the portion of the rod immediately adjacent thereto to form a lip, the outer surface of said lip being concave to prevent slippage when in operative use.

BERNARD J. SHEPARD.